(No Model.)

J. A. MISSUD.
SEWER PIPE.

No. 407,102.  Patented July 16, 1889.

WITNESSES:
Fred G. Dieterich
Jos. A. Ryan

INVENTOR
John A. Missud
BY
ATTORNEY

UNITED STATES PATENT OFFICE.

JOHN ALFRED MISSUD, OF NEW ORLEANS, LOUISIANA.

SEWER-PIPE.

SPECIFICATION forming part of Letters Patent No. 407,102, dated July 16, 1889.

Application filed March 21, 1889. Serial No. 304,229. (No model.)

*To all whom it may concern:*

Be it known that I, JOHN ALFRED MISSUD, residing at New Orleans, in the parish of Orleans and State of Louisiana, have invented certain new and useful Improvements in Sewer-Pipes, of which the following is a specification.

My invention relates particularly to sewer or drainage pipes, and has for its object to provide a pipe which may be effectively flushed, when desired, to remove all the sediment that may accumulate in the bottom thereof.

My invention consists in a pipe constructed substantially in the manner hereinafter described in the annexed specification, and particularly pointed out in the claims, reference being had to the accompanying drawings, in which—

Figure 1:
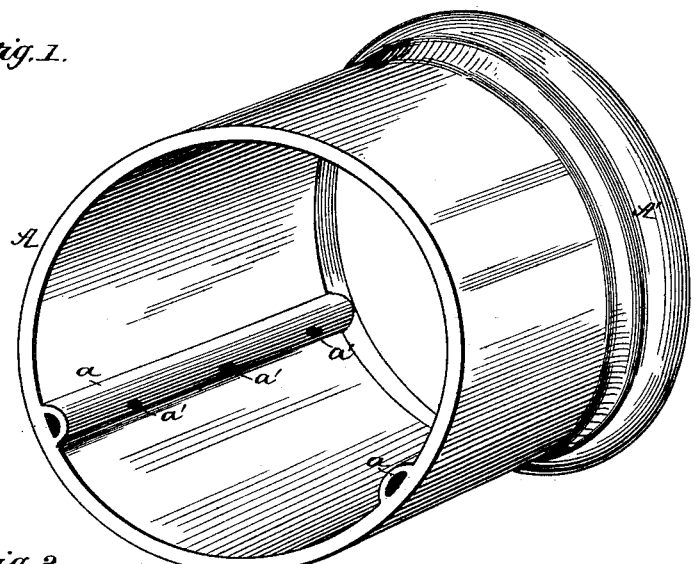
Figure 2:
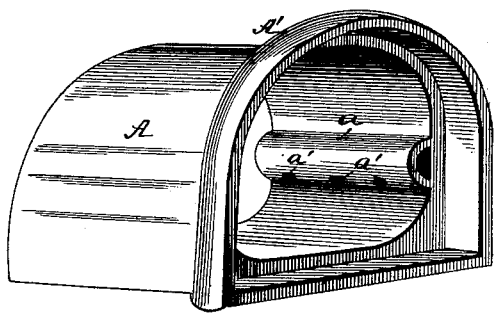
Figure 3:
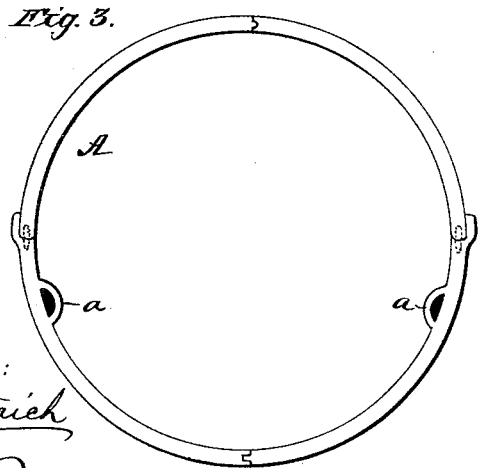

Figure 1 is a perspective view of a section of my improved pipe cylindrical in shape. Fig. 2 is a similar view showing a pipe constructed arched shape; and Fig. 3 is a view illustrating a modification, hereinafter referred to.

In carrying out my invention I employ a pipe A, of clay, iron, or any other suitable material, which is provided on its lower inner face with pipe or tube portions *a a*, cast integral therewith and extending the entire length of the said pipes. The tube portions *a a* are approximately semicircular in cross-section, and are formed on the inner faces of the pipe near the lower part of the same, as clearly shown in the drawings. The lower side of the tube portions *a a* is provided with a series of perforations *a' a'*, for a purpose presently described.

One end of each length of the pipe A is provided with the usual coupling-collar A' for the reception of the small end of the adjacent pipe-section when connected therewith. The pipes may, however, be formed of the same diameter their entire length, and the different sections may be joined by a union-coupling, if desired.

When the pipes A are placed end to end, as usual, the tubes *a a* will register with each other, thus forming a continuous pipe having continuous perforated inner tube portions.

In operation, when it is desired to remove the sediment collected in the bottom of the pipe A, water is forced through the tube-sections *a*, which will be discharged with considerable force in small jets through the perforations *a' a'* in direction of the bottom of the pipe, and thereby cause the sediment to be stirred up and be washed away by the water passing through the body of the pipe proper.

The pipe A may be made circular and in one piece, as shown in Fig. 1, or it may be made in the shape of an arch, as shown in Fig. 2, or it may be made in sections, as shown in Fig. 3.

From the foregoing description, taken in connection with the drawings, the advantages of my invention will readily appear. It will be seen that the pipes formed as described can be made at a small cost, and that the same will be very effective for its desired purpose.

Having thus described my invention, what I claim as new is—

1. A pipe provided with perforated supplemental pipes or tubes arranged upon its inner side, said supplemental pipes formed integral with the main pipe, substantially as shown and described.

2. A pipe provided with supplemental pipes or tubes perforated along the entire length, as shown, said supplemental pipes or tubes cast integral with the body of the main pipe and extended the entire length thereof and disposed on the lower inner surface of said main pipe, substantially as shown.

3. The pipe A, formed of sections, one or more of the lower sections provided with a supplemental perforated pipe or tube extending its entire length cast integral therewith, substantially as and for the purpose described.

JOHN ALFRED MISSUD.

Witnesses:
J. F. ALLAIN,
EDWARD SIMEON.